US008498362B2

(12) United States Patent
Zhang et al.

(10) Patent No.: US 8,498,362 B2
(45) Date of Patent: Jul. 30, 2013

(54) CHANNEL SOUNDING AND ESTIMATION STRATEGIES FOR ANTENNA SELECTION IN MIMO SYSTEMS

(75) Inventors: Hongyuan Zhang, Sunnyvale, CA (US); Rohit U. Nabar, Sunnyvale, CA (US); Peter Loc, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 1066 days.

(21) Appl. No.: 12/363,269

(22) Filed: Jan. 30, 2009

(65) Prior Publication Data

US 2009/0196372 A1 Aug. 6, 2009

Related U.S. Application Data

(60) Provisional application No. 61/025,519, filed on Feb. 1, 2008.

(51) Int. Cl.
  *H04B 15/00* (2006.01)
(52) U.S. Cl.
  USPC ............ 375/285; 375/267; 375/296; 375/346
(58) Field of Classification Search
  USPC .................. 375/267, 285, 340, 346, 347, 296
  See application file for complete search history.

(56) References Cited

U.S. PATENT DOCUMENTS

| 7,486,740 B2 | 2/2009 | Inanoglu |
| 2004/0085939 A1 | 5/2004 | Wallace et al. |
| 2006/0291544 A1* | 12/2006 | Fischer et al. ................ 375/219 |
| 2008/0298264 A1* | 12/2008 | Ramesh et al. ............... 370/252 |
| 2009/0290563 A1* | 11/2009 | Gu et al. ...................... 370/338 |

FOREIGN PATENT DOCUMENTS

| JP | 2006-504336 | 2/2006 |
| JP | 2007-531467 | 11/2007 |
| WO | WO-2004/039022 | 5/2004 |
| WO | WO-2005/034387 A2 | 4/2005 |
| WO | WO-2005/101772 | 10/2005 |
| WO | WO-2007/040515 | 4/2007 |
| WO | WO-2007/040554 | 4/2007 |
| WO | WO-2007/040564 A1 | 4/2007 |

OTHER PUBLICATIONS

International Search Report for PCT/US2009/032659, mailed Jan. 25, 2010.
Written Opinion of the International Searching Authority for PCT/US2009/032659, mailed Jan. 25, 2010.

(Continued)

*Primary Examiner* — Shuwang Liu
*Assistant Examiner* — David Huang

(57) ABSTRACT

Techniques and devices for antenna selection in a multiple-input-multiple-output (MIMO) system, in which communication is between a transmitter having a first plurality of radio-frequency (RF) chains coupled to a first plurality of antennas and a receiver having a second plurality of RF chains coupled to a second plurality of antennas, are provided. Techniques include receiving consecutive sounding packets each have a training symbol and that collectively sound a full-size channel for the MIMO system. A sub-channel estimate for each sounding packet can then be determined based on various factors, such as a known power level rule and gain factor. Scaling factors may be applied to each of these sub-channel estimates to produce a scaled sub-channel estimates.

12 Claims, 8 Drawing Sheets

OTHER PUBLICATIONS

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

International Preliminary Report on Patentability from PCT/US2009/032659, dated Aug. 3, 2010.

International Standard, ISO/IEC 8802-11, ANSI/IEEE Std 802.11, Information technology—Telecommunications and information exchange between systems—Local and metropolitan area networks—Specific requirements—Part 11: Wireless LAN Medium Access Control (MAC) and Physical Layer (PHY) specifications (1999).

IEEE Std 802.11a-1999, Supplemental to IEEE Standard for Information technology—Telecommunications and information exchange between systems—Local and metropolitan area networks—Specific requirements—Part 11: Wireless LAN Medium Access Control (MAC) and Physical Layer (PHY) specifications, High-speed Physical Layer in the 5 GHz Band, (1999/2000).

IEEE Std 802.11b-1999, Supplemental to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (1999).

IEEE P802.11g/D8.2, Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band (2003).

IEEE P802.11 Wireless LANs, TGn Sync Proposal Technical Specification, Abstract (2005).

IEEE Standard for Local and metropolitan area networks, Part 16: Air Interface for Fixed Broadband Wireless Access Systems—Amendment 2: Medium Access Control Modifications and Additional Physical Layer Specifications for 2-11 GHz (2003).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

IEEE P802.16Rev2/D5 (Jul. 2008) (Revision of IEEE Std 802.16/2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, Jun. 2008.

"Calibration Procedure for TDD Beamforming", Qualcomm Europe, 3GPP TSG RAN1 #50-bis, R1-073908, Oct. 8-12, 2007, 7 pages.

"Antenna Calibration Using Frequency Selection in OFDMA/TDD Systems", Yoshitaka et al., The Institute of Electronics, Information and Communication Engineers (IEICE) Technical Report, vol. 107, No. 440, Jan. 17, 2008, pp. 55-60 (English abstract only).

Notification of the First Office Action in CN Patent Application No. 200980103891.0 dated Dec. 4, 2012, 13 pages.

Summary of Notice of Reasons for Rejection in JP Patent Application No. 2010-545209 dated Mar. 12, 2013, 2 pages.

* cited by examiner

CHANNEL SOUNDING AND ESTIMATION STRATEGIES FOR ANTENNA SELECTION IN MIMO SYSTEMS

CROSS-REFERENCES TO RELATED APPLICATIONS

The present application claims the benefit of U.S. Provisional Application No. 61/025,519, entitled "CHANNEL SOUNDING AND ESTIMATION STRATEGIES FOR ANTENNA SELECTION IN MIMO SYSTEMS," filed on Feb. 1, 2008, the entire contents of which are hereby incorporated by reference herein.

FIELD OF TECHNOLOGY

The present invention relates generally to wireless communication systems and, more particularly, to channel sounding and estimation techniques in wireless systems employing multiple antennas.

DESCRIPTION OF THE RELATED ART

Wireless communications continue to experience large growth in consumer demand and services. Wide coverage area systems such as cellular networks are commonplace, but increasingly so to are local area systems such as "WiFi," IEEE 802.11a, and IEEE 802.11b systems. In fact, various wireless technologies are described in detail in the 802.11 IEEE Standards, including for example, the IEEE Standard 802.11a (1999) and its updates and amendments, the IEEE Standard 802.11g (2003), and the IEEE Standard 802.11n (Draft 3.0) now in the process of being adopted, all of which are collectively incorporated herein fully by reference. The later standards in particular have been or are in the process of being commercialized with the promise of 54 Mbps or more effective bandwidth, making them a strong competitor to traditional wired Ethernet and the more common "802.11b" or "WiFi" 11 Mbps mobile wireless transmission standard. Generally speaking, many wireless communications systems use multi-carrier modulation schemes for data transmission. Communication systems compliant with the IEEE 802.11a and 802.11g or "802.11a/g" as well as the 802.11n standards, for example, may use Orthogonal Frequency Division Multiplexing (OFDM) which is a digital multi-carrier modulation scheme that employs a large number of relatively closely spaced orthogonal sub-carriers or sub-channels. Each sub-carrier is modulated at a relatively low symbol rate using a modulation scheme such as quadrature amplitude modulation, phase shift keying, etc. Each frequency sub-band of an OFDM system may be viewed as an independent transmission channel within which to send data, thereby increasing the overall throughput or transmission rate of the communication system. Even though data on a particular sub-carrier is modulated at a low symbol rate, the large number of sub-channels provides an overall data rate similar to single-carrier modulation schemes that utilize the same bandwidth.

Generally, transmitters used in the wireless communication systems that are compliant with the aforementioned 802.11a/802.11g/802.11n standards as well as other standards such as the 802.16a IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals that may be propagated in the communication system and/or to compensate for deleterious effects associated with the various propagation paths, multiple transmit and receive antennas may be used. Such a system is commonly referred to as a multiple-input, multiple-output (MIMO) wireless transmission system and is specifically provided for within the 802.11n IEEE Standard now being adopted. Generally speaking, the use of MIMO technology can produce significant increases in spectral efficiency and link reliability; and these benefits generally increase with the number of transmission and receive antennas within the MIMO system.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

Proper antenna selection (ASEL) is important to achieving the desired beamforming and beamsteering in MIMO systems. For OFDM systems like those outlined in the IEEE 802.11n specification, ASEL may involve selecting the best antenna elements at the transmitter and/or receiver for the particular data rate, data type, channel, etc., and then switching those antenna elements into a limited number of transmitter and receiver radio-frequency chains. The ASEL determination may be based on the CSI acquired by a channel training (sounding) procedure, which is defined in IEEE 802.11n Draft 3.0 as encompassing either a transmitter-side (TX ASEL) training procedure or a receiver-side (RX ASEL) training procedure. By effectively managing this training procedure ASEL may be improved and better transmission and reception properties may be achieved.

SUMMARY OF THE DISCLOSURE

In an embodiment, a method of antenna selection in a multiple-input-multiple-output (MIMO) system, wherein communication is between a transmitter having a first plurality of radio-frequency (RF) chains coupled to a first plurality of antennas and a receiver having a second plurality of RF chains coupled to a second plurality of antennas, includes: receiving from the transmitter consecutive sounding packets that each have a training symbol and that collectively sound a full-size channel for the MIMO system, where the consecutive sounding packets are produced by applying a power level rule to the first plurality of RF chains at the transmitter; determining a sub-channel estimate for each corresponding consecutive sounding packet based on the power level rule and a gain factor for each of the received consecutive sounding packets; and applying respective scaling factors to each sub-channel estimate to produce scaled sub-channel estimates, wherein the respective scaling factors are dependent upon the power level rule and the respective gain factors.

In another embodiment, a method of antenna selection in a multiple-input-multiple-output (MIMO) system, wherein communication is between a transmitter having a first plurality of radio-frequency (RF) chains coupled to a first plurality of antennas and a receiver having a second plurality of RF chains coupled to a second plurality of antennas, includes: transmitting consecutive sounding packets that each have a training symbol and that collectively sound a full-size channel for the MIMO system, where the consecutive sounding packets are produced by the first plurality of RF chains at the transmitter; receiving channel state information for each of a plurality of scaled sub-channel estimates determined at the receiver, the channel state information including at least one of respective gain factors applied to the consecutive sounding packets received at the receiver and respective scaling factors applied to determine sub-channel estimates at the receiver; and in response to receiving the channel state information, the transmitter adjusting the power levels applied to the first plurality of RF chains.

In another embodiment, a multiple-input-multiple-output (MIMO) transmitter apparatus includes: an antenna switch for coupling to a plurality of MIMO antennas, wherein the switch is controllable to select from among the plurality of MIMO antennas for transmission of a full-size MIMO channel signal; a plurality of radio-frequency (RF) chains for supplying the full-size MIMO channel to the antenna switch; and a controller configured to control the plurality of RF chains to transmit consecutive sounding packets on the plurality of MIMO antennas, each sounding packet having a training symbol and the sounding packets collectively forming the full-size MIMO channel signal, the controller being further configured to receive channel state information from a receiver sent in response to the transmission of the full-size MIMO channel signal, wherein the controller is configured to adjust power levels on the RF chains in response to the channel state information.

In another embodiment, a multiple-input-multiple-output (MIMO) receiver apparatus includes: an antenna switch for coupling to a plurality of MIMO antennas, wherein the switch is controllable to select from among the plurality of MIMO antennas for receipt of a full-size MIMO channel sent by a MIMO transmitter in the form a consecutive sounding packets each having a training symbol and that collectively sound the full-size MIMO channel for the MIMO system; a plurality of radio-frequency (RF) chains for processing the consecutive sounding packets received at the receiver; and a controller configured to determine a power level rule applied by the MIMO transmitter in transmitting the consecutive sounding packets, to determine a sub-channel estimate for each consecutive sounding packet based on the power level rule and a respective gain factor for each of the received consecutive sounding packets, and to apply respective scaling factors to each of sub-channel estimate to produce scaled sub-channel estimates, wherein the respective scaling factors are dependent upon the power level rule and the respective gain factors.

DETAILED DESCRIPTION

Described below are example channel sounding and estimation techniques that may be used in MIMO systems to improve ASEL. The techniques may be implemented in various types of MIMO systems, such as OFDM(A) (OFDM and Orthogonal Frequency Division Multiple Access) MIMO systems sending data over signals having a channelization bandwidth of 20 MHz divided into 56 sub-carriers as set forth in IEEE 802.11n, Draft 3.0, or 40 MHz divided into a larger number of sub-carriers as set forth in subsequent drafts. OFDM(A) MIMO systems may employ various digital modulation and mapping schemes including binary phase-shift keying (BPSK), quadrature phase-shift keying (QPSK), 16 bit quadrature amplitude modulation (16-QAM), 64-QAM, or 256-QAM.

Each transmitter and receiver in an MIMO system will have multiple antennas that are selected to produced desired beamforming and beamsteering and thereby optimize data transmission between the transmitter and receiver. As discussed further below, the transmitter, the receiver, or both may perform this antenna selection (ASEL). For example, the receiver may perform ASEL by knowing a pre-determined transmitter power level rule applied at the transmitter and then conducting appropriate scaling based on that transmit power level and a receiver gain factor. The transmitter may perform ASEL through a joint strategy with the receiver, where the receiver scales sub-channel estimates of the full-size channel appropriately and then feeds back channel state information (CSI) to the transmitter which then performs ASEL based on the CSI; or through a single device strategy in which transmitter adjusts its power levels based on a determination of the proximity of the receiver.

Figure 1:
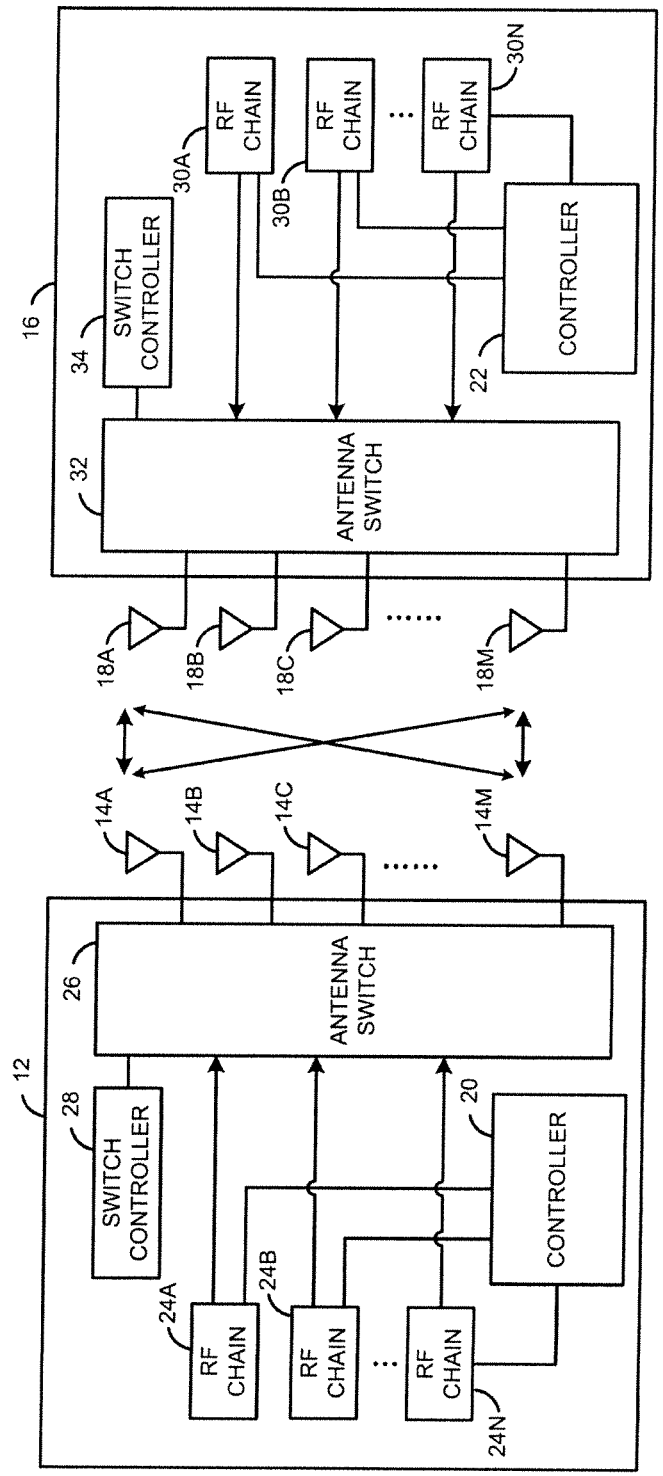
FIG. 1 is a block diagram of a wireless communication configuration in which a MIMO transmitter and a MIMO receiver are able to communicate with each other.

FIG. 1 illustrates an example MIMO communication system 10 in block diagram form as generally including a single MIMO transmitter 12 having multiple antennas 14A-14M for communicating with a single MIMO receiver 16 having multiple antennas 18A-18M. The number of transmission antennas 14A-14M may be the same as, more than, or less than the number of receiver antennas 18A-18M. A controller 20 in the transmitter 12 and a controller 22 in the receiver 16 controller general operation of each MIMO wireless device, respectively. The controllers 20 and 22 may be implemented as one or more standard multi-purpose, programmable processors, such as micro-processors, application specific integrated circuits (ASICs), etc. or may be implemented using any other desired types of hardware, software and/or firmware.

The transmitter includes a plurality of radio frequency (RF) chains 24A-24N that each may form a MIMO datapath for an antenna producing the RF signals that are to be applied to the antennas 14A-14M. In a MIMO OFDM(A) architecture, for example, each RF chain may perform frequency interleaving of a spatial incoming data stream, QAM constellation point mapping (e.g., using BPSK, QPSK, 16-QAM, 64-QAM, or 256-QAM) interleaved bits, antenna mapping of the mapped spatial data to the desired antenna streams, time domain transformation, and analog to digital conversion and final RF processing. The output of each transmitter RF chain 24A-24N is coupled to an antenna switch 26, controlled by a switch controller 28. As discussed further below, the controller 20 performs ASEL and control and also determines the power level applies by each of the RF chains 24A-24N to optimally beamform and beamsteer the MIMO datapaths between the transmitter 12 and the receiver 16.

Similar to the transmitter 12, the receiver 16 includes a plurality of RF chains 30A-30N that are each coupled to an antenna switch 32 under control by a controller 34, which along with the controller 22 each may perform similar functions to those described above with respect to the transmitter 12.

Figure 2:
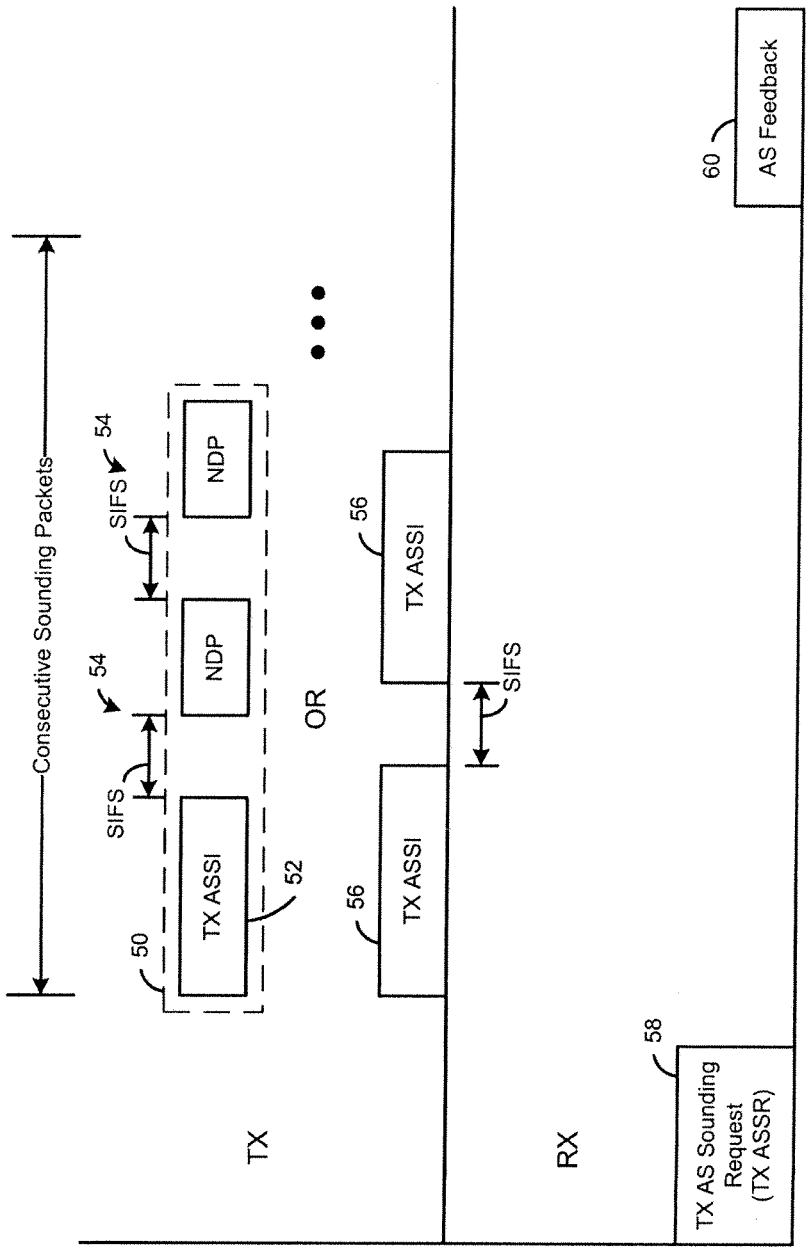
FIG. 2 is a diagram of an example antenna selection (ASEL) training procedure using consecutive sounding packets sent by the MIMO transmitter in a transmitter-based ASEL determination.
Figure 3:
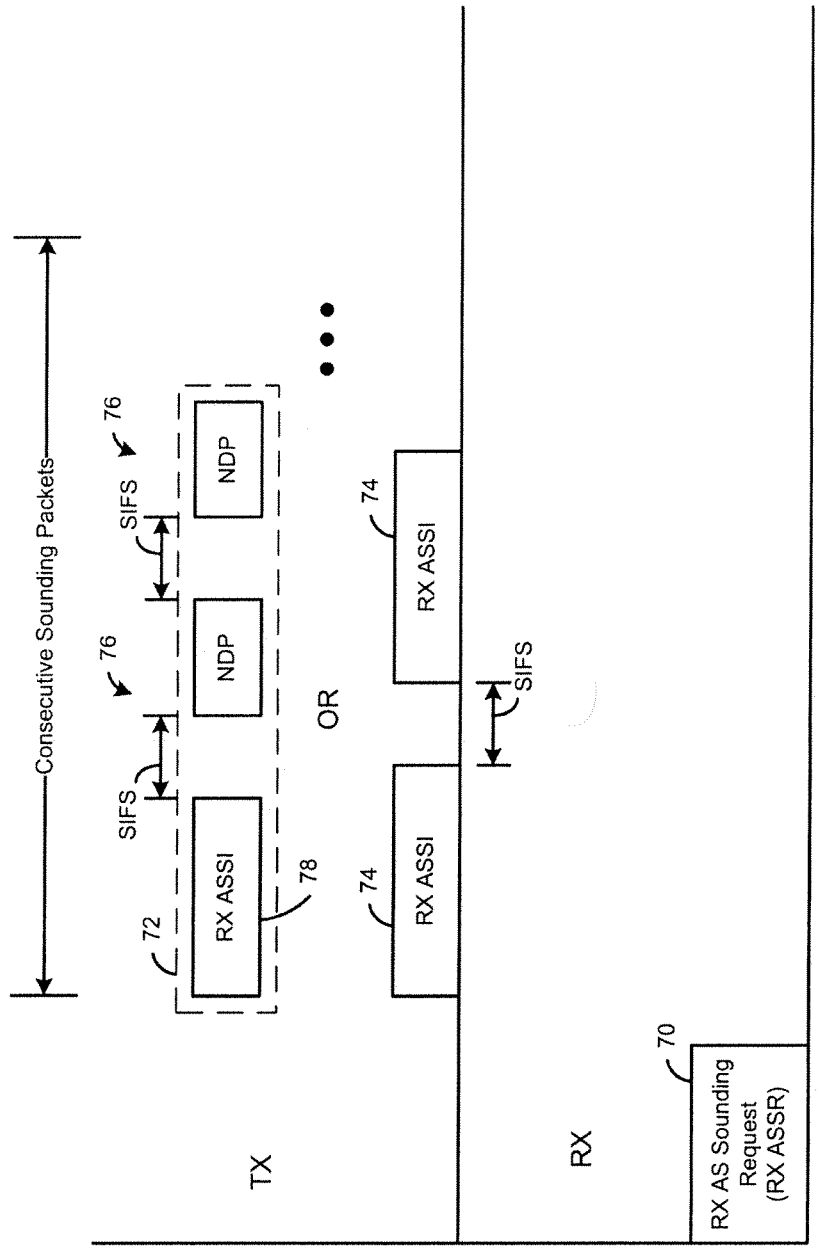
FIG. 3 is a diagram of another example ASEL training procedure using consecutive sounding packets in a receiver-based ASEL determination.

To train the MIMO channels between the transmitter 12 and receiver 16, and to allow for proper ASEL and beamsteering and beamforming control, the MIMO system 10 may execute a training procedure as generally illustrated in FIGS. 2 and 3. The training techniques described herein allow for ASEL in situations where the number of antennas, $M_{TX}$, is larger than the number of respective RF chains, $N_{TX}$, in either or both of the transmitter 12 and the receiver 16. As a starting point, an ASEL sounding protocol as defined in the current draft, Draft 3.0, of the IEEE 802.11n standard describes sending consecutive sounding packets from the transmitter 12 to sound the full-size channel corresponding to all transmitter antennas 14A-14M, where the transmitter 12 may switch to a different subset of these antennas 14A-14M each sounding packet until the full-size channel has been sounded.

In reference to FIG. 2, the transmitter 12 may send consecutive sounding packets in two example ways. First, the transmitter 12 may send a High Throughput Control field (+HTC) (not shown) with a null data packet (NDP) equal to 1 to announce for the receiver 16 the commencement of consecutive sounding PLCP Protocol Data Units (PPDUs) 50, which are each formed of a transmitter antenna selection sounding information (TX ASSI) signal 52 followed by a series of adjacent short inter-frame spacing interval (SIFS) and NDP 54 signal pairs. Alternatively, the transmitter 12 may send a series of segmented sounding PPDUs signals 56 each spaced apart by a SIFS. This antenna sounding, training mode may be initiated by the receiver 16 sending a transmitter AS sounding request (TX ASSR) 58 signal to the transmitter 12.

FIG. 2 illustrates a training procedure in an transmitter ASEL (TX ASEL) mode, in which the receiver 16 responds to the sounding PPDUs 50 or 56 with an antenna system (AS) feedback signal 60, which may be a full-size channel state information (CSI) signal that is analyzed by the controller 20 to set power level policy, etc. for the RF chains 24A-24N. As CSI data, the AS feedback signal 60 may include any of a number of signal information, including scaling indices applied by the receiver 16 for selected antennas 18A-18M, which information may be used by the transmitter 12 during a TX ASEL procedure to regulate control of its antennas 14A-14M.

FIG. 3 illustrates a training procedure in a receiver ASEL (RX ASEL) mode initiated by a receiver antenna selection sounding request signal 70 sent from the receiver 16 to the transmitter 12. This training procedure may be utilized when the number ($M_{RX}$) of antenna elements 18A-18M is larger than the number ($N_{RX}$) of RF chains 30A-30N. The transmitter 12 transmits consecutive sounding PPDUs 72 or 74 that are used to sound the full-size channel corresponding to all receiver antenna elements 18A-18M. In the example of PPDU 72, the transmitter transmits an HTC+ frame and NDP announcement bit (not shown) followed an RX ASSI data block 76 and a series of SIFS and NDP signal pairs 78. Alternatively, the consecutive sounding PPDUs 74 may be transmitted using a plurality of segmented sounding PPDUs, each separated from another by the SIFS. Because ASEL is performed at the receiver station, no AS feedback or other feedback is required.

When transmitting consecutive sounding packets in either the TX ASEL training procedure (FIG. 2) or the RX ASEL training procedure (FIG. 3), the transmit power settings and receiver scaling of each of the sounding packets will affect the accuracy of full-size CSI estimation. Thus to address this problem techniques for optimizing channel sounding and estimations for ASEL have been proposed. In a RX ASEL training procedure, for example, the transmit power levels applied by the RF chains 24A-24N for the ASEL sounding packets may be made to conform to a predetermined or otherwise set power transmission rule, that is known to receiver 16 and allows the receiver 16 to properly baseline the received signals. Based on this power level rule and accounting for any receiver analog/digital scaling factors, which can vary from packet-to-packet, the receiver 16 may adjust, i.e., scale, the amplitude of each estimated sub-channel upon receiving each ASEL sounding packet before the receiver 16 assembles all the sub-channels into the full-size CSI.

On the other hand, when the communication system is in a TX ASEL training procedure, and the receiver 16 is feeding back the full-size CSI as signal 60, the transmitter 12 may alter the power levels of the RF chains 24A-24N accordingly. For example, the transmitter 12 may apply additional power scaling from packet-to-packet to avoid distortion, e.g., due to non-linearity in the power-amplifier. In some examples, the transmitter 12 may intentionally adjust its transmit power level for consecutive sounding packets to improve the quality of channel sounding or alternately to conserve power, in response to the feedback signal 60.

To achieve such improvements, the following MIMO channel model may be used. Consider an $N_R \times N_T$ MIMO channel that represents one subcarrier in an OFDM system, where $N_R$ is the number of RF chains 30A-30N and $N_T$ is the number of RF chains 24A-24N. This $N_R \times N_T$ MIMO channel is represented at baseband by the expression $H_s$. If G is taken as the composite gain (including digital+analog) factor at the receiver 16 and P is the power level of each transmit RF chain 24A-24N, while x is a transmit data vector that assumes unit average power in each dimension, then the MIMO channel between the transmitter and receiver may be modeled as follows:

$$y = GH_s\sqrt{P}x + n \quad \text{(Expression 1)}$$

where n is a noise factor.

Although not required, in some examples, the number of antenna elements ($M_T$) at the transmitter will be greater than the number of transmitter RF chains, $N_T$. In some examples, the number of antenna elements ($M_R$) at the receiver will be greater than the number of receiver RF chains, $N_R$. In other examples, few antenna elements may be used. In either case, the transmitter 12 and the receiver 16 are not required to have the same number of antenna elements or RF chains.

In any event, a full-size MIMO channel, H, includes the output from all the transmitter antenna elements, $M_T$, and the input from the receiver elements, $M_R$, and is thus an $M_R \times M_T$ MIMO channel, H. The antenna switches 26 and 32 within each transmitter 12 and receiver 16, respectively, are used to control antenna selection based on the channel estimation of this full-size $M_R \times M_T$ MIMO channel, H, where $H_s$ in Expression 1 is a submatrix of this full-size MIMO channel H.

Whether the MIMO system 10 is to use a TX ASEL procedure or an RX ASEL procedure may be determined based on the number of antennas and RF chains. For example, when $M_T > N_T$ and $M_R = N_R$ then a TX ASEL training procedure may be used. When $M_T = N_T$ and $M_R > N_R$, then an RX ASEL training procedure may be used. When $M_T > N_T$ and $M_R > N_R$ then antenna selection may occur from joint transmitter and receiver selection. In this later case, for example, a TX ASEL training procedure may have the receiver determine the antenna selection based on received signal values, but then communicate that determination to the transmitter were where antenna selection and power scaling occurs.

In Expression 1, the gain factor G at the receiver may be governed by the automatic gain control (AGC) design for the MIMO system, as well as by other RF chain parameters or conditions. These values therefore are not design parameters adjustable for ASEL channel estimation, but rather constants for determining ASEL.

Applying the channel model of Expression 1 during an ASEL sounding process in which N consecutive sounding packets are sent from the transmitter to the receiver, the corresponding baseband input-output relations would be as follows:

$$y_1 = G_1 H_1 \sqrt{P_1}\, x_1 + n_1$$
$$y_2 = G_2 H_2 \sqrt{P_2}\, x_2 + n_2$$
$$\vdots$$
$$y_N = G_N H_N \sqrt{P_N}\, x_N + n_N$$

For these channel expressions, it is assumed that $x_1, \ldots, x_N$ are known training symbols, such that the estimated sub-channels corresponding to each sounding packet may be expressed as:

$$\tilde{H}_i = G_i H_i \sqrt{P_i} + v_i \quad \text{(Expression 2)}$$

where $v_i$ is the channel estimation error.

From these individual estimated sub-channels, the full-size estimated channel, used for ASEL computation, may be expressed as:

$$\tilde{H} = [a_1 \tilde{H}_1 \ldots a_N \tilde{H}_N] = [a_1 G_1 H_1 \sqrt{P_1} \ldots a_N G_N H_N \sqrt{P_N}] \quad \text{(Expression 3)}$$

for a TX ASEL training procedure, or as $$\tilde{H} = \begin{bmatrix} a_1 \tilde{H}_1 \\ \vdots \\ a_N \tilde{H}_N \end{bmatrix} \quad \text{(Expression 4)}$$

for an RX ASEL training procedure. In both expressions, the values $a_i$ are the scaling factors applied by the receiver when assembling the full-size channel matrix.

Expressions 3 and 4 represent the estimated full-size channel at the receiver 16. The true full-size channel is represented as:

$$H = [H_1 \ldots H_N] \text{ or } \begin{bmatrix} H_1 \\ \vdots \\ H_N \end{bmatrix} \quad \text{(Expression 5)}$$

If there is no channel estimation distortion, then the full-size channel expression can be expressed as a scalar of the full-size estimated channel expression, with the same scalar applied across all sub-channels:

$$\tilde{H} = \beta H \quad \text{(Expression 6)}$$

where $\beta$ is a scalar constant independent of transmit/receive antenna subset.

In this model, however, without appropriate design, the assembled full-size estimated channel may have distortion due to different effective power levels (strengths) of the estimated sub-channels $\{\tilde{H}_i\}$. To address this problem, techniques have been developed to jointly design the power level rule, $P_i$, at transmitter and the scaling factor rules, $a_i$, at the receiver to minimize this channel estimation distortion, and do so by allowing for different strategies for ASEL computation at the receiver side and at the transmitter side.

As generally discussed above, there are two different training procedures, or modes, under which antenna selection can occur.

Figure 4:
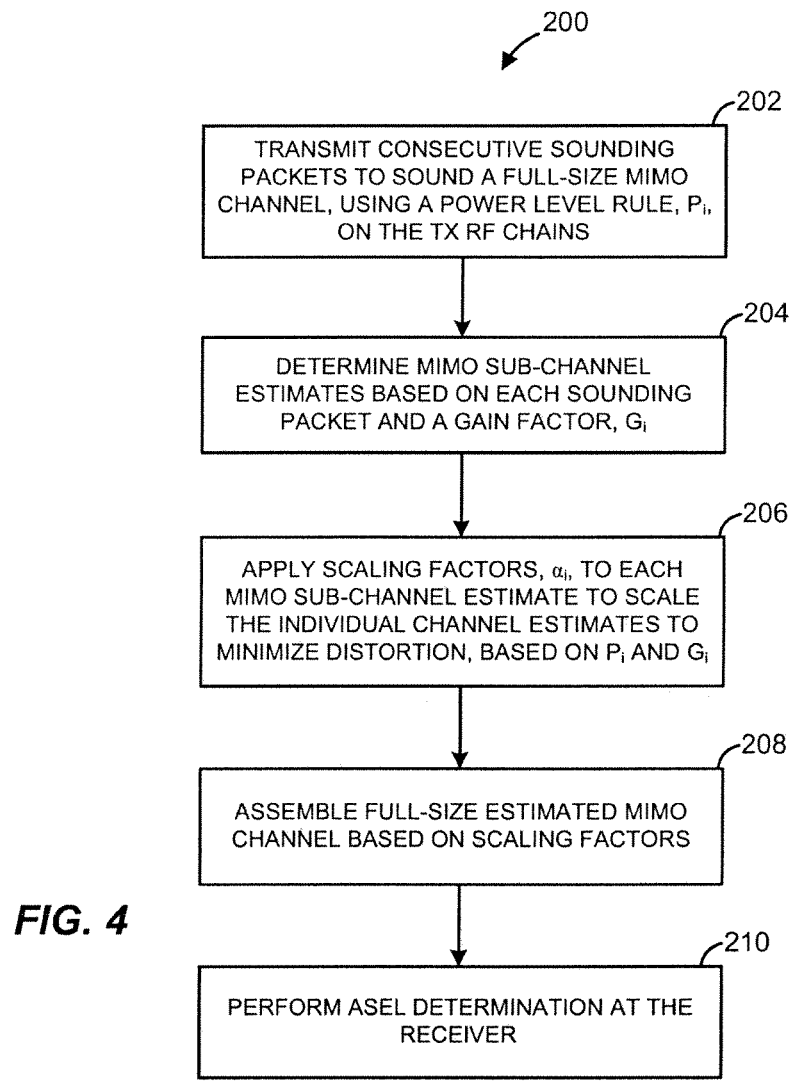
FIG. 4 is a flow diagram of a receiver-based ASEL determination using scaling factors applied by the receiver to minimize distortion on a full-size MIMO channel.

FIG. 4 illustrates an example method for a RX ASEL training procedure 200. At a block 202, the transmitter 12 uses pre-determined power rule, $P_i$, to power the RF chains 24A-24N, where this power rule is known to the receiver 16. The pre-determined power rule may be one specified in a wireless communication standard, such as 802.11, 802.16, 3GPPP Long Term Evolution (LTE), etc. Although this need not be the case, as any reasonable power rule may be used instead.

One example rule to be applied by block 202 is to have a constant power level across all RF chains 24A-24N for consecutive ASEL sounding packets, in which case, $P_i=P$, a constant. In a MIMO system according to 802.11n, for example, the system may be programmed to ensure that the MAC layer does not change the TX PWR_LEVEL parameter in the MAC/PHY interface when sending consecutive ASEL sounding packets.

The power rule may be based on setting the individual powers levels of each transmitter chain, as in this example. However, other power rules may be based the totals of all power levels across all the transmitter chains. For example, another power rule may adjust power levels, $P_i$, such that the TOTAL power across all active RF chains 24A-24N is constant for ASEL sounding packets, which means that if the number of transmit antennas sounded is not constant across sounding packets, then $P_i$ is not constant. For example, if a device has four (4) antennas and four (4) transmitter RF chains to be sounded in total using two (2) consecutive sounding packets, then a first sounding packet could be established that sounds three (3) of the four antennas using three of the transmitter RF chains, and a second sounding packet could be established that sounds the remaining antenna using the remaining transmitter RF chain, where from these two sounding packets the system would train the entire full-size channel.

These power rules are provided by way of example. Preferably, the power rule is established at the protocol or wireless standard-level, such that the power rule is formed in a hardware, firmware, or software of all compliant devices. Furthermore, compliant MIMO devices may be compatible with multiple power rules, where the particular power rule in use is coordinated among communicating devices, either by the service provider or by the devices communicating power rule data to synchronize with each other.

In any event, the consecutive sounding packets resulting from block 202 are received at the receiver 16, which determines MIMO sub-channel estimates based on the sounding packets which have amplitudes that have been inherently modified on a per signal basis by the gain factor, $G_i$, at block 204.

With the power level rule $P_i$ in place and the gain factor $G_i$, and both known to the receiver, the receiver 16 may then adjust the scaling factors $a_i$ of Expressions 3 and 4 to minimize distortion when assembling the full-size estimated MIMO channel. The minimization of distortion may be designed such that the estimated MIMO channel becomes a scalar of the original full-size MIMO channel from the transmitter 12, according to the Expression 6, $\tilde{H}=\beta H$.

A block 208 assembles the scaled sub-channel estimates into the estimated full-size MIMO channel, for example, by applying Expressions 3 and 4. Block 210 then computers the ASEL, using known techniques, based on the full-size estimated MIMO channel.

In another example, similar to that of FIG. 4 but with ASEL determination performed at the transmitter 12, the following determinations could be applied. Assuming that a constant power level rule, $P_i=P$, is applied to the RF chains 24A-24N for consecutive sound packets, the receiver gain factor may be expressed as:

$$G_i = GT/E[\|y_i\|] \quad \text{(Expression 7)}$$

where GT is a constant regardless of i, which means that the signal for each RF chain 30A-30N is scaled so that the average amplitude is GT. From Expression 7, the full-size MIMO channel (CSI) matrix can be expressed as follows (with constant values isolated from each sub-channel expression):

$$\tilde{H} = [a_1 \tilde{H}_1 \ldots a_N \tilde{H}_N]$$
$$= GT\sqrt{P} \left[ a_1 \frac{1}{E[\|y_1\|]} H_1 \ldots a_N \frac{1}{E[\|y_N\|]} H_N \right] \quad \text{(Expression 8)}$$

From Expression 8, the receiver 16 may scale the individual channel estimates using the following expression:

$$a_i = E[\|y_i\|] \quad \text{(Expression 9)}$$

which reflects the average received signal (yi) strength corresponding to each of the consecutive sounding packets.

By setting the scaling factors applied by the receiver when assembling the full-size channel matrix in this way, the distortion factor is thus minimized, and the Expression 6, $\tilde{H}=\beta H$, may then be properly used to determine the full-size channel state information. Expressions 7-9 may be applied in accordance with the blocks 202-206 as discussed above.

Figure 5:
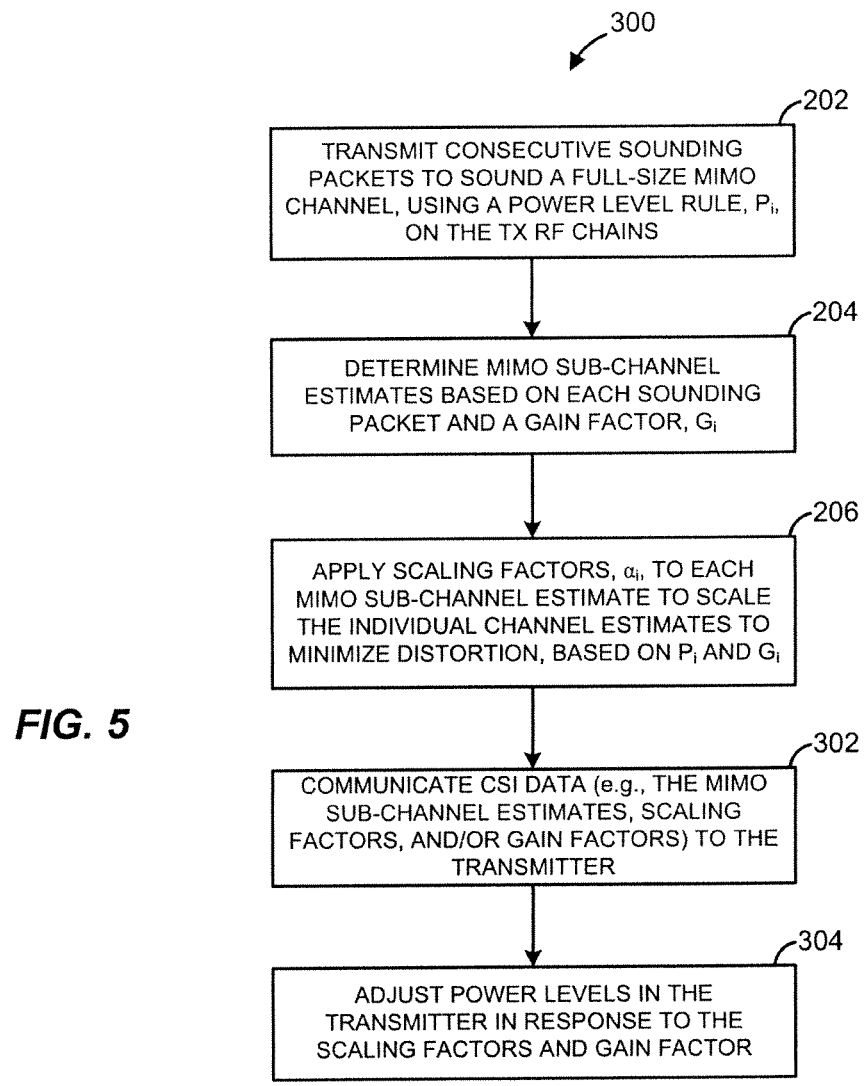
FIG. 5 is a flow diagram of a transmitter-based ASEL determination using scaling factors and gain factors to adjust power levels on the signals transmitted from the transmitter.

While FIG. 4 is described as illustrating the training procedure of TX AESL computed at the receiver (and the selected antenna indices fed back to the transmitter), the procedure 200 could be modified into a TX ASEL in which the receiver 16 determines the scaling factors for each of the sub-channels and communicates the resulting scaled sub-channel estimates, $\{a_i \tilde{H}_i\}$, back to the transmitter 12, as CSI data. In response, the transmitter 12 may then adjust its power level strategies for sending consecutive sounding packets to optimize performance, for example, to reduce packet error rates. An example of such an TX ASEL training procedure 300 is shown in FIG. 5, bearing similar reference numerals to that of FIG. 4, but showing that a block 302 communicates the scaled sub-channel estimates, $\{a_i \tilde{H}_i\}$, in the form of CSI data, back to the transmitter 12, which then identifies the scaling factor, $a_i$, and along with the gain factor, $G_i$, determines new power level settings and adjusts the power levels accordingly at block 304.

The procedure 200 can also be extended to RX ASEL procedure, where the estimated channel is expressed by Expression 4. In this example, Expression 8 may still be applied by transposing the right hand side of the equation of Expression 8; and Expression 9 is still valid for the receiver 16 to scale the channel estimations when composing the full-size channel for receiver ASEL computation.

In some examples, the scaling rule $a_i$ and/or the gain factor $G_i$ may already be known to the transmitter 12, e.g., by defining both through the wireless communication protocol or standard—IEEE 802.11, 802.16, LTE, etc. In an IEEE 802.11n compliant ASEL protocol, for example, the channel encoding strategy for the protocol may be used to set the scaling factors, $a_i$, such that the receiver 16 always applies the same scaling factor rules to create the sub-channel estimates of the corresponding sounding packets regardless of $P_i$ and $G_i$. An example IEEE 802.11n scaling factor rule may be:

$$a_i = \frac{1}{\max\{\text{real}|\tilde{H}_i|, \text{imag}|\tilde{H}_i|\}} \quad \text{(Expression 10)}$$

In such cases, where the scaling factor is predetermined, this leaves only the gain factor $G_i$ setting as needed at the transmitter 12, where with both values the transmitter 12 can adjust its power level policy to lessen distortion on the full-size MIMO channel communicating with the receiver 16. When the gain factor is needed at the transmitter, the gain factors may be communicated to the transmitter 12 by the receiver 16 or they may be preset at the transmitter 12.

When the scaling rule is not part of a standard or protocol or otherwise already known at the transmitter 12, the TX ASEL training procedure may require that both $a_i$ and $G_i$ be sent from the receiver 16 as CSI data, e.g., from block 302, in order for the transmitter 12 to conduct its own scaling of received signals to minimize distortion. For example, if the receiver 16 applies a scalar $a_i$ that is constant regardless of i, the transmitter 12 receiving the scaled sub-channel estimates from the receiver 16 may identify that scalar in the received signal and apply a similar scaling rule (e.g., a constant scalar regardless of i) before assembling the feedback sub-channel estimations into the full size channel estimation. Such a scaling rule at the transmitter 12 may also depend on the power levels, $P_i$, at the RF chains 24A-24N, which is already known at the transmitter 12 but not necessarily known at the receiver 16.

With the transmitter scalars set, the transmitter 12 may adjust its power level strategies for sending consecutive sounding packets to optimize performance (packet error rate). In this case, the transmitter RF chain power levels can be freely adjusted because the CSI feedback is always appropriately scaled by the receiver 16. This ability to dynamically set the transmitter RF chain power levels allows the MIMO communication system to achieve various levels of flexibility. Thus, in some examples, the transmitter upon receiving the scaled CSI feedback from the receiver may determine that the receiver is nearby, upon which the transmitter may adjust its initial power level settings downward from that used in the consecutive sounding packets, to thereby save power. In other examples, the transmitter may determine that the receiver is far away and increase power level settings to thereby improve performance.

One of the basic assumptions of antenna selection sounding using multiple sounding packets is that the MIMO channel barely changes over the over-the-air duration of sending and receiving these sounding packets. But in some cases, this assumption may not be true; the channel may change fast. As such, in some examples, depending on the channel conditions, the transmitter may perform a lower power sounding to test the MIMO channel and to track channel variations. In some examples, the MIMO system may probe a channel using only subset of the antennas, with a lower power sounding packets, to detect if the channel has changed, and thereafter determine if full antenna training, which can be intensive, is warranted. Of course, these are just some example applications in which controlling the transmitter chain power levels for sending consecutive ASEL sounding packets can be beneficial.

The above techniques may be applied to either single-carrier MIMO systems or multiple-carrier MIMO systems such as OFDM(A) systems, where the expressions listed above would be applied per sub-carrier, instead of per channel. That is, the sounding packet identifier i represents the sub-carrier (or sub-channel) index. Such OFDM(A) system may include IEEE 802.11n (e.g., "WiFi"), IEEE 802.16 (e.g., "WiMax"), 3GPPP Long Term Evolution (LTE), and others. LTE is considered a 4G communication standard which offers improved throughput and speed and reduced latency over 3G standards, such as UMTS, and 2G standards such as GSM, and is capable of supporting all IP-based services including voice, video, rich media and messaging with end-to-end Quality of Service (QoS). The LTE Physical Layer (PHY) employs both OFDMA and MIMO data transmission, through smart antennas. For example, the LTE PHY may use OFDMA for downlink communications from the base station to remote user equipment and Single Carrier Frequency Division Multiple Access (SC-FDMA) for uplink communications from the remote users to the base station.

ASEL methods such as those described above may be utilized in various MIMO devices. For example, techniques as described above may be utilized in base stations, access points, wireless routers, etc. The transmitter 12 may represent a base station, for example, and the receiver 16 any remote wireless device (mobile device or otherwise), or vice versa. Additionally, FIGS. 6A-6F illustrate various devices in which ASEL techniques such as described above, may be employed.

Figure 6A:
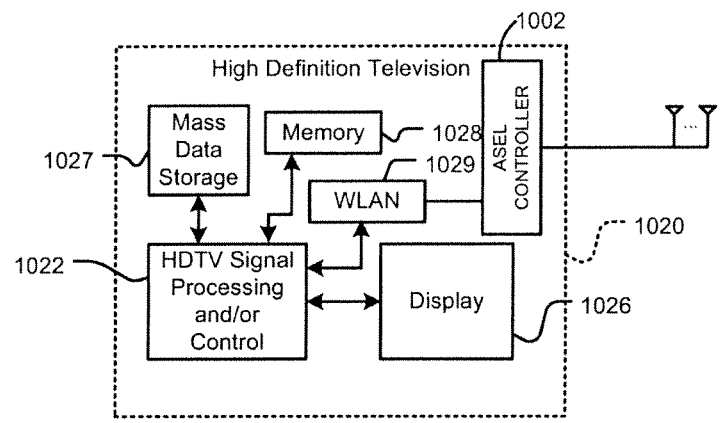
FIG. 6A is a block diagram of a high definition television that may utilize ASEL techniques such as described herein.

Referring now to FIG. 6A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The HDTV 1020 may include an ASEL controller 1002 that includes RF chains, an antenna switch, switch controller, and controller as discussed above in the example of the transmitter 12, to perform channel sounding and estimation and determine ASEL for a MIMO antenna.

Figure 6B:
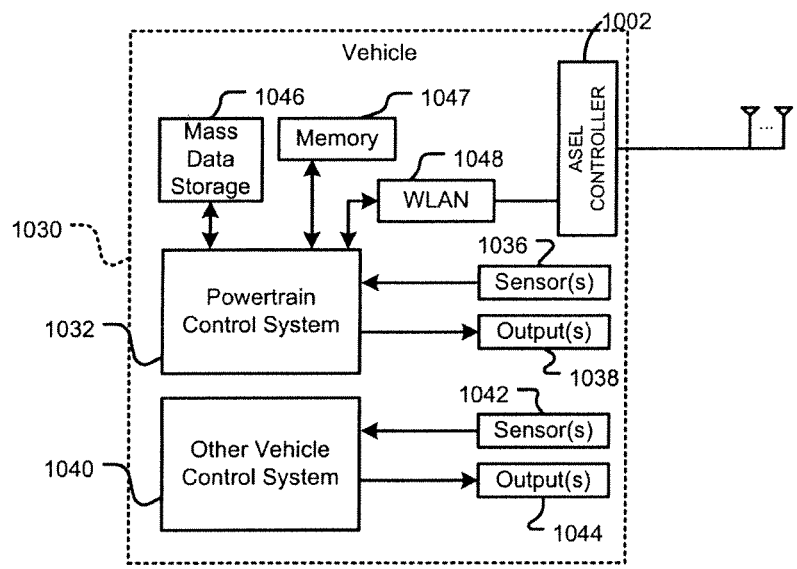
FIG. 6B is a block diagram of a vehicle that may utilize ASEL techniques such as described herein.

Referring now to FIG. 6B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). The vehicle 1030 may include the ASEL controller 1002 to perform channel sounding and estimation and determine ASEL for a MIMO antenna.

Figure 6C:
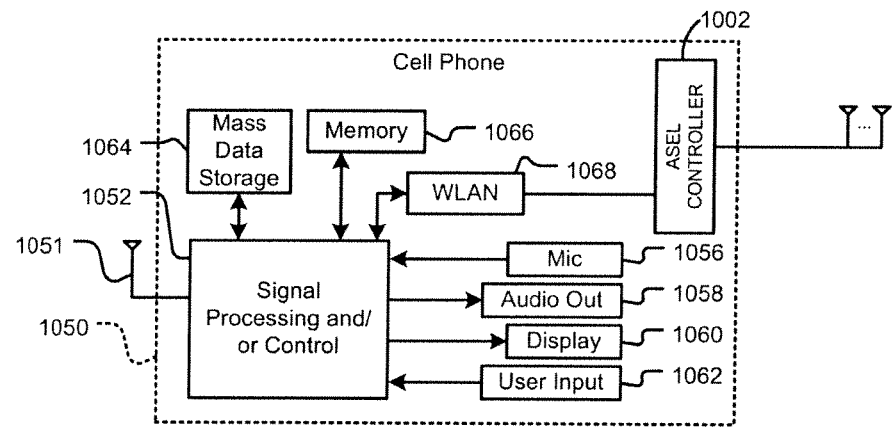
FIG. 6C is a block diagram of a cellular phone that may utilize ASEL techniques such as described herein.

Referring now to FIG. 6C, such techniques may be used in a cellular phone 1050 that may include a cellular antenna 1051. The cellular phone 1050 may include either or both signal processing and/or control circuits, which are generally identified in FIG. 6C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The cellular phone 1050 may include the ASEL controller 1002 to perform channel sounding and estimation and determine ASEL for a MIMO antenna.

Figure 6D:
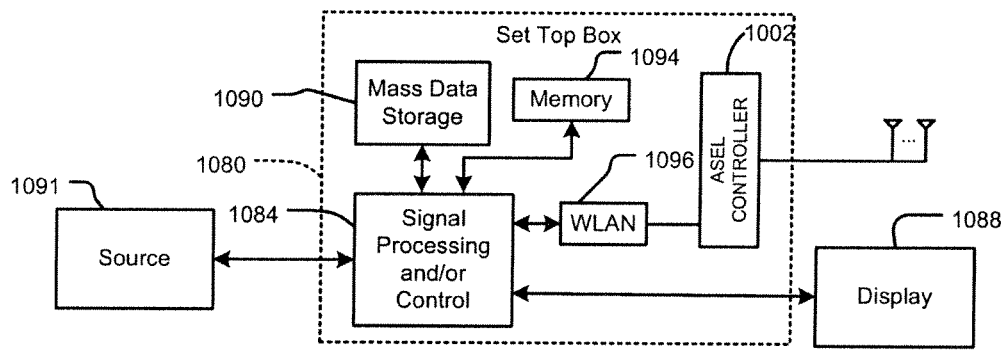
FIG. 6D is a block diagram of a set top box that may utilize ASEL techniques such as described herein.

Referring now to FIG. 6D, such techniques may be utilized in a set top box 1080. The set top box 1080 may include either or both signal processing and/or control circuits, which are generally identified in FIG. 6D at 1084, a WLAN interface and/or mass data storage 1090 of the set top box 1080. Set top box 1080 receives signals from a source 1091 such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The set top box 1080 may include the ASEL controller 1002 to perform channel sounding and estimation and determine ASEL for a MIMO antenna.

Figure 6E:
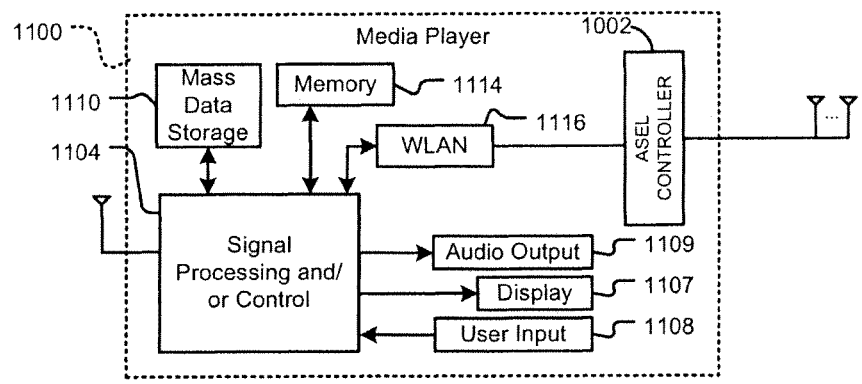
FIG. 6E is a block diagram of a media player that may utilize ASEL techniques such as described herein.

Referring now to FIG. 6E, such techniques may be used in a media player 1100. The media player 1100 may include either or both signal processing and/or control circuits, which are generally identified in FIG. 6E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The media player 1100 may include the ASEL controller 1002 to perform channel sounding and estimation and determine ASEL for a MIMO antenna.

Figure 6F:
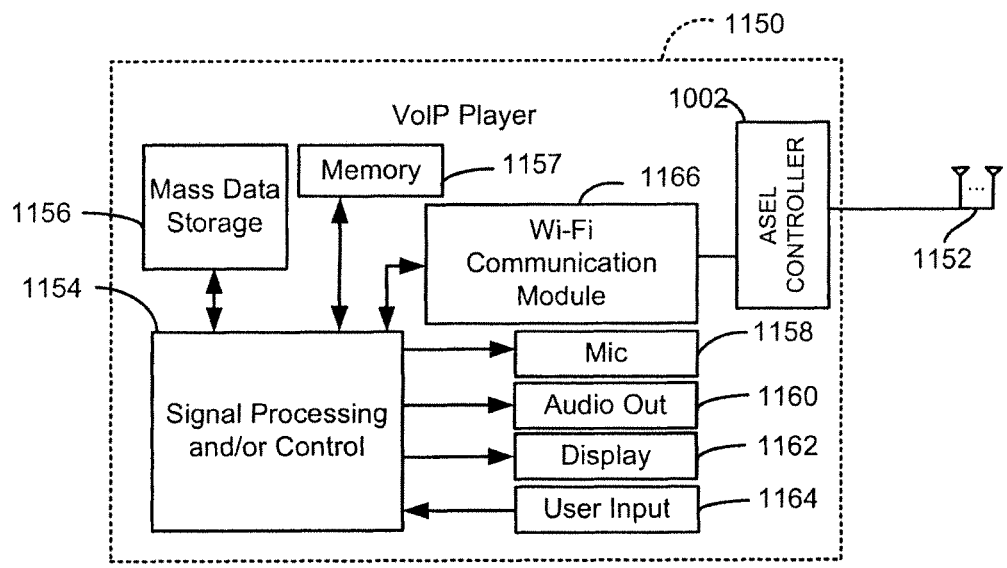
FIG. 6F is a block diagram of a voice over IP device that may utilize ASEL techniques such as described herein.

Referring to FIG. 6F, such techniques may be utilized in a Voice over Internet Protocol (VoIP) phone 1150 that may include a MIMO antenna 1152. The VoIP phone 1150 may include either or both signal processing and/or control circuits, which are generally identified in FIG. 6F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The VoIP phone 1150 may include the ASEL controller 1002 to perform channel sounding and estimation and determine ASEL for a MIMO antenna.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed:

1. A method of antenna selection in a multiple-input-multiple-output (MIMO) system, wherein communication is between a transmitter having a first plurality of radio-frequency (RF) chains coupled to a first plurality of antennas and a receiver having a second plurality of RF chains coupled to a second plurality of antennas, the method comprising:
   receiving from the transmitter consecutive sounding packets that each have a training symbol and that collectively sound a full-size channel for the MIMO system, where the consecutive sounding packets are produced by applying a power level rule to the first plurality of RF chains at the transmitter;
   determining a sub-channel estimate for each corresponding consecutive sounding packet based on the power level rule and a gain factor for each of the received consecutive sounding packets; and
   applying respective scaling factors to each sub-channel estimate to produce scaled sub-channel estimates, wherein the respective scaling factors are dependent upon the power level rule and the respective gain factors.

2. The method of claim 1, wherein the transmitter applies the power level rule to the first plurality of RF chains such that each of the first plurality of RF chains uses the same power level for each of the consecutive sounding packets.

3. The method of claim 1, wherein the transmitter applies the power level rule to the first plurality of RF chains such that the sum of the power levels applied for all first plurality of RF chains is constant for each of the consecutive sounding packets.

4. The method of claim 1, further comprising determining the respective scaling factors according to the following relationships, $$\tilde{H}_i = G_i H_i \sqrt{P_i} + v_i,$$

where i is an index of the respective sounding packet and has a value of 1 to N, $G_i$ is the gain factor applied at the receiver for each respective sounding packet, $H_i$ is a MIMO sub-channel corresponding to the consecutive sounding packets, $P_i$ is the power level rule, $v_i$ is a channel estimation error for each respective sounding packet, and $\tilde{H}_i$ is an estimated sub-channel, $$\tilde{H} = [a_1 \tilde{H}_1 \ldots a_N \tilde{H}_N] = [a_1 G_1 H_1 \sqrt{P_1} \ldots a_N G_N H_N \sqrt{P_N}],$$

where $a_i$ is the scaling factor for each respective sounding packet applied by the receiver, and $$\tilde{H} = \beta H,$$

where H is the full-size channel and $\beta$ is a scalar factor.

5. The method of claim 4, further comprising determining the respective scaling factors to minimize distortion of the full-size channel received at the receiver.

6. The method of claim 1, further comprising:
   the receiver sending an antenna selection sounding request to the transmitter; and
   in response to the antenna selection sounding request, the transmitter transmitting the consecutive sounding packets.

7. The method of claim 1, further comprising assembling the scaled sub-channel estimates into a full-size estimated MIMO channel.

8. The method of claim 1, wherein the MIMO system is a single carrier MIMO system and the full-size channel represents a single MIMO channel.

9. The method of claim 1, wherein the MIMO system is an Orthogonal Frequency Division Multiple Access (OFDMA) MIMO system and the full-size channel represents a MIMO sub-channel.

10. The method of claim 1, wherein the MIMO system is an IEEE 802.11n or IEEE 802.16 compliant communication system.

11. A multiple-input-multiple-output (MIMO) receiver apparatus comprising:
   an antenna switch for coupling to a plurality of MIMO antennas, wherein the switch is controllable to select from among the plurality of MIMO antennas for receipt of a full-size MIMO channel sent by a MIMO transmitter in the form of consecutive sounding packets each having a training symbol and that collectively sound the full-size MIMO channel for the MIMO system;
   a plurality of radio-frequency (RF) chains for processing the consecutive sounding packets received at the receiver; and a controller configured to determine a power level rule applied by the MIMO transmitter in transmitting the consecutive sounding packets, to determine a sub-channel estimate for each consecutive sounding packet based on the power level rule and a respective gain factor for each of the received consecutive sounding packets, and to apply respective scaling factors to each of sub-channel estimate to produce scaled sub-channel estimates, wherein the respective scaling factors are dependent upon the power level rule and the respective gain factors.

12. The MIMO receiver apparatus of claim 11, wherein the controller is configured to determine the respective scaling factors according to the following relationships, $$\tilde{H}_i = G_i H_i \sqrt{P_i} + v_i,$$

where i is an index of the consecutive sounding packets and has a value of 1 to N, $G_i$ is the gain factor for each of the consecutive sounding packets, $H_i$ is a MIMO sub-channel corresponding to the consecutive sounding packets, $P_i$ is the power level rule for each of the consecutive sounding packets, $v_i$ is a channel estimation error for each of the sounding packets, and $\tilde{H}_i$ is an estimated sub-channel, $$\tilde{H} = [a_1 \tilde{H}_1 \ldots a_N \tilde{H}_N] = [a_1 G_1 H_1 \sqrt{P_1} \ldots a_N G_N H_N \sqrt{P_N}],$$

where $a_i$ is the scaling factor for each respective sounding packet applied by the receiver, and $$\tilde{H} = \beta H,$$

where H is the full-size channel and $\beta$ is a scalar factor.

* * * * *